(12) United States Patent
Margalit

(10) Patent No.: US 10,990,682 B2
(45) Date of Patent: Apr. 27, 2021

(54) SYSTEM AND METHOD FOR COPING WITH FAULT INJECTION ATTACKS

(71) Applicant: Nuvoton Technology Corporation, Hsinchu Science Park (TW)

(72) Inventor: Ilan Margalit, Tel-Aviv (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 390 days.

(21) Appl. No.: 15/845,412

(22) Filed: Dec. 18, 2017

(65) Prior Publication Data
US 2019/0188391 A1    Jun. 20, 2019

(51) Int. Cl.
| | |
|---|---|
| *G06F 11/00* | (2006.01) |
| *G06F 12/14* | (2006.01) |
| *G06F 12/16* | (2006.01) |
| *G06F 21/00* | (2013.01) |
| *G06F 21/57* | (2013.01) |

(Continued)

(52) U.S. Cl.
CPC ........... *G06F 21/577* (2013.01); *G06F 21/54* (2013.01); *G06F 21/552* (2013.01); *G06F 2221/034* (2013.01); *G06F 2221/2113* (2013.01); *G06F 2221/2137* (2013.01)

(58) Field of Classification Search
CPC ...... G06F 21/577; G06F 21/552; G06F 21/54; G06F 2221/2113; G06F 2221/2137; G06F 2221/034; G01N 35/085; H02H 1/003
See application file for complete search history.

(56) References Cited

U.S. PATENT DOCUMENTS

| | | | | |
|---|---|---|---|---|
| 6,167,479 | A | * 12/2000 | Hartnett | ............. G06F 9/30065 710/260 |
| 6,216,218 | B1 | * 4/2001 | Sollars | ................. G06F 9/3001 710/38 |

(Continued)

OTHER PUBLICATIONS

Domenico Cotroneo, "Fault Injection for Software Certification", 2013, IEEE, pp. 38-45 (Year: 2013).*

(Continued)

*Primary Examiner* — Shewaye Gelagay
*Assistant Examiner* — Kevin Ayala
(74) *Attorney, Agent, or Firm* — Oliff PLC

(57) ABSTRACT

A security system dynamically, depending on processor core execution flow, controls fault injection countermeasure circuitry protect processor core from fault injection attacks. Includes a processor core which, when in use, executes instructions and concurrently, generates, in real time, output indications of instructions to be executed; a fault injection detector having selectable sensitivity levels; and a sensitivity level control module operative, in real time, to receive the output indications, select a next sensitivity level using sensitivity level selection logic which receives the output indications as inputs, and set the fault injection detector to the next sensitivity level, thereby to provide fault injection countermeasure circuitry which is differentially sensitive, when protecting the processor core from fault injection attacks, depending on the output indications of the instructions, and/or avoids false alarms which would result if processor core protection were provided at a sensitivity level unrelated to the output indications of the instructions.

26 Claims, 7 Drawing Sheets

(51) Int. Cl.
*G06F 21/54* (2013.01)
*G06F 21/55* (2013.01)

(56) References Cited

U.S. PATENT DOCUMENTS

| | | | | |
|---|---|---|---|---|
| 8,612,995 | B1* | 12/2013 | Yun | G06F 13/00 719/313 |
| 9,523,736 | B2 | 12/2016 | Hershman et al. | |
| 9,703,945 | B2 | 7/2017 | Hershman et al. | |
| 2005/0251708 | A1* | 11/2005 | Bancel | G06F 21/52 714/49 |
| 2009/0038008 | A1* | 2/2009 | Pike | G06F 21/52 726/22 |
| 2010/0082927 | A1* | 4/2010 | Riou | G06F 12/1433 711/163 |
| 2014/0344932 | A1* | 11/2014 | Polychronakis | G06F 21/562 726/23 |
| 2015/0106872 | A1* | 4/2015 | Hiser | G06F 21/56 726/1 |
| 2016/0105282 | A1* | 4/2016 | Henry | H04L 9/0825 713/190 |
| 2016/0110274 | A1* | 4/2016 | Ito | G06F 11/26 714/41 |
| 2017/0344438 | A1* | 11/2017 | Bilgiday | G06F 21/71 |
| 2018/0173534 | A1* | 6/2018 | Peled | G06F 9/3806 |
| 2018/0349612 | A1* | 12/2018 | Harel | G06F 21/577 |

OTHER PUBLICATIONS

Bilgiday Yuce, "Improving Fault Attacks on Embedded Software using RISC Pipeline Characerization", 2015, Virginia TEch, pp. 97-108 (Year: 2015).*
http://www.invia.fr/detectors/voltage-glitch-detector.aspx; Oct. 22, 2016.
Loic Zussa et al.; Efficiency of a glitch detector against electromagnetic fault injection; Date: Design, Automation and Test in Europe, Mar. 2014, Dresden, Germany; IEEE, pp. 1-6, 2014; Design, Automation and Test in Europe Conference and Exhibition (Date), 2014.
J. Balasch et al.; Sep. 2011; An In-depth and Black-box Characterization of the Effects of Clock Glitches on 8-bit MCUs; In Fault Diagnosis and Tolerance in Cryptography (FDTC), 2011 Workshop on (pp. 105-114); IEEE.
M.S. Kelly et al.; May 2017; Characterising a CPU fault attack model via run-time data analysis; In Hardware Oriented Security and Trust (HOST); 2017 IEEE International Symposium on (pp. 79-84). IEEE.
N. Moro et al.; May 2014; Experimental evaluation of two software countermeasures against fault attacks; In Hardware-Oriented Security and Trust (HOST); 2014 IEEE International Symposium on (pp. 112-117). IEEE.
N. Moro et al.; Aug. 2013; Electromagnetic fault injection: towards a fault model on a 32-bit microcontroller; In Fault Diagnosis and Tolerance in Cryptography (FDTC); 2013 Workshop on (pp. 77-88). IEEE.
B. Giller; Implementing practical electrical glitching attacks; Black Hat Europe; Nov. 2015.
T. Barry et al.; Jan. 2016; Compilation of a countermeasure against instruction-skip fault attacks; In Proceedings of the Third Workshop on Cryptography and Security in Computing Systems (pp. 1-6); ACM.
A. Barenghi et al.; 2010; Low-Cost Software Countermeasures Against Fault Attacks: Implementation and Performances Trade Offs.; In Proc. of the 5th workshop on Embedded Security, WESS (pp. 7-1).
M. McDonald et al.; "Basic Operation of a DLX Machine"; https://www.cs.umd.edu/~meesh/cmsc411/website/projects/dlx/proj.html; Aug. 1, 2015.
http://infocenter.arm.com/help/index.jsp?topic=/com.arm.doc.ddi0432c/CHDCICDF.html; 2009.
https://www.tutorialspoint.com/assembly_programming/assembly_loops.htm; Nov. 3, 2017.
A.G. Yanci et al.; Aug. 2009; Characterization of a voltage glitch attack detector for secure devices; In Bio-inspired Learning and Intelligent Systems for Security, 2009. BLISS '09. Symposium on (pp. 91-96). IEEE.
W. He et al.; Dec. 2016; Cheap and cheerful: a low-cost digital sensor for detecting laser fault injection attacks; In International Conference on Security, Privacy, and Applied Cryptography Engineering (pp. 27-46).; Springer, Cham.
https://en.wikipedia.org/wiki/Central_processing_unit#Structure_and_implementation; Nov. 6, 2017.
https://en.wikipedia.org/wiki/Instruction_cycle; Nov. 8, 2017.
https://en.wikipedia.org/wiki/Instruction_pipelining; Nov. 11, 2017.

* cited by examiner

Fig. 1 (Prior Art)

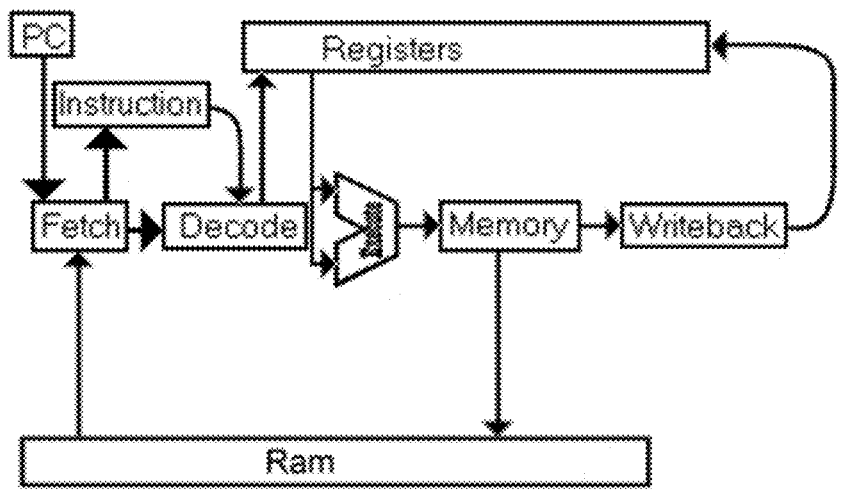

Fig. 2

1. provide processor core / CPU which is vulnerable to fault injection and which produces signals indicating which instruction/opcode, or family/group of opcodes, is executed at any given moment.
↓
2. risk analysis : system designer associates security risk e.g. risk of fault injection to a list of opcodes or groups of opcodes and generates sensitivity level decision/selection logic accordingly. For example: conditional branch opcodes – high risk; all other opcodes – low risk
↓
3. provide fault injection detector with at least two sensitivity levels
↓
4. implement sensitivity-level adjustment of CM circuit e.g. provide a CM circuit whose sensitivity level is adjustable in real time, say by dynamic selection of one of the at least two levels. Typically, the fault injection detector supports dynamic e.g. real-time adjustment of sensitivity levels which operates in real time and has a response time which is shorter than the decode-execution cycle of a single instruction by the processor or CPU being secured by the fault injection detector.

Fig. 4

310. CPU provides opcode indicator I to sensitivity level control module
320: sensitivity level decision/selection logic in sensitivity level control module generates a decision: CM circuit's sensitivity level should be L_I
330: sensitivity level control module signals (or commands) sensitivity level control module to adjust cm circuit's sensitivity level to L_I
340: responsively, sensitivity level control module issues a sensitivity level control signal to the CM circuit
350: CM circuit adjusts its sensitivity level to L_I. The level may, for example, be adjusted using a suitable selector element whose controls comprise, or are derived from, the sensitivity level control command which are indicative of which opcode is about to be executed.

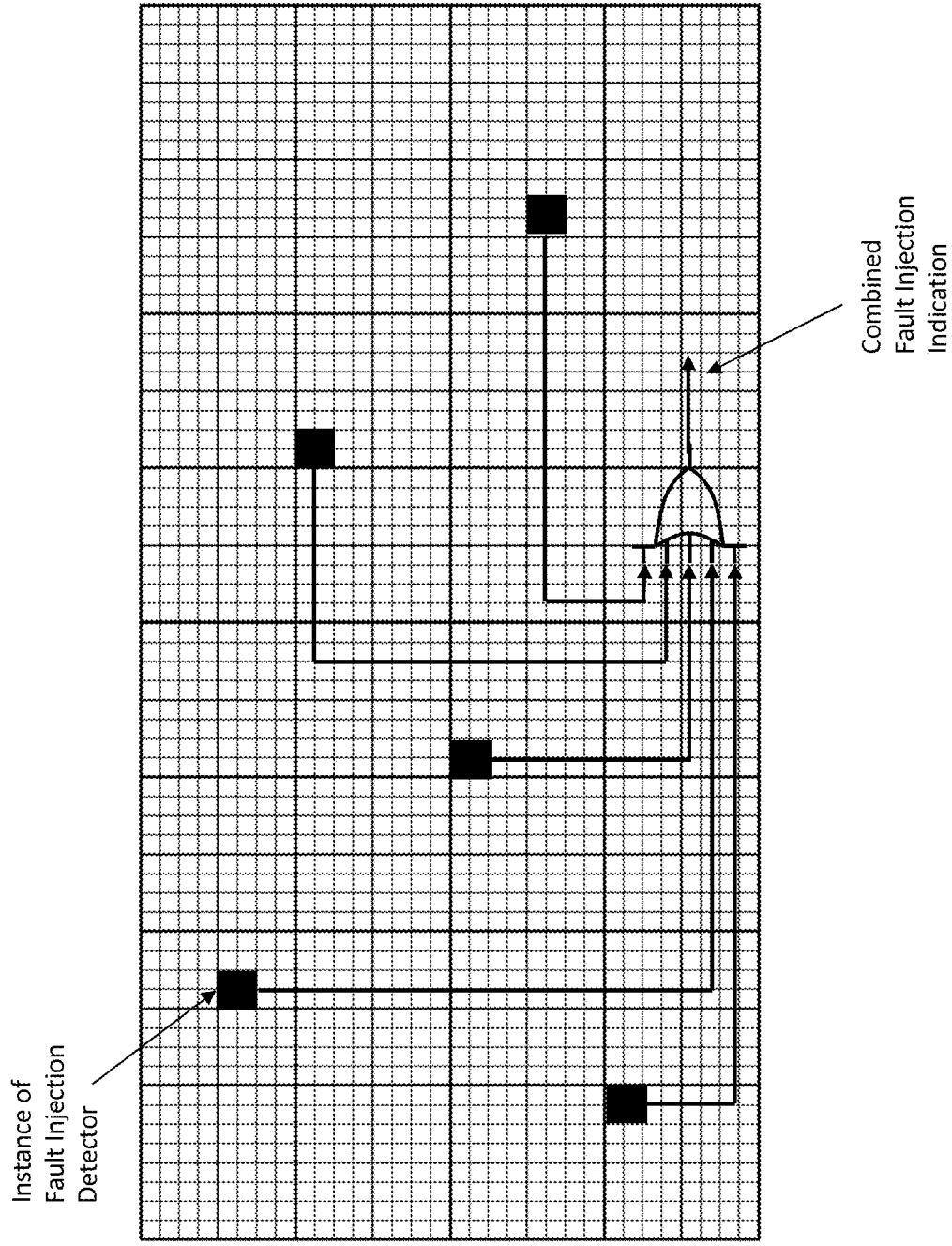

SYSTEM AND METHOD FOR COPING WITH FAULT INJECTION ATTACKS

REFERENCE TO CO-PENDING APPLICATIONS

None.

FIELD OF THIS DISCLOSURE

The present invention relates generally to device security, and more particularly to coping with fault injection attacks.

BACKGROUND FOR THIS DISCLOSURE

Co-owned U.S. Pat. No. 9,523,736 and its prior art describe conventional security countermeasure (CM) mechanisms and circuits.

Countermeasure mechanisms whose sensitivity levels are adjustable, may be known Glitch detectors are known and described e.g. in the following links: https://hal.inria.fr/emse-01099006/document these are described as having "configurable detection thresholds"; and https://hal.inria.fr/emse-01099006/document "An In-depth and Black-box Characterization of the Effects of Clock Glitches on 8-bit MCUs" by Josep Balasch, Benedikt Gierlichs, and Ingrid Verbauwhede is a white paper, available from IEEE, which describes fault injection research.

"Characterising a CPU Fault Attack Model via Run-Time Data Analysis" by Martin S. Kelly et al is a white paper, available from IEEE, which describes fault injection research.

"Experimental evaluation of two software countermeasures against fault attacks" by Nicolas Moro et al is a white paper, available from IEEE, which evaluates software countermeasures.

"Electromagnetic fault injection: towards a fault model on a 32-bit microcontroller" by Nicolas Moro et al is a white paper, available from IEEE, which describes fault injection research.

State of the art knowledge regarding glitching attacks is described in NCC Group's "Implementing Practical Electrical Glitching Attacks", dated November 2015 and available via Internet at https://www.blackhat.com/docs/eu-15/materials/eu-15-Giller-Implementing-Electrical-Glitching-Attacks.pdf.

Countermeasures in software, e.g. duplication of instructions, are described in: "Compilation of a Countermeasure Against Instruction-Skip Fault Attacks" by Thierno Barry, Damien Courouss_e, Bruno Robisson and available via Internet at https://hal-cea.archives-ouvertes.fr/cea-01296572/document, and in "Low-Cost Software Countermeasures Against Fault Attacks: Implementation and Performances Trade Offs" and available via Internet at http://euler.ecs.umass.edu/research/bpbk-WESS-2010.pdf.

Authentication mechanisms which operate based on tracking the execution flow of the CPU, exist, for example co-owned U.S. Pat. No. 9,703,945.

Prior art FIG. 1 herein is taken from "Basic Operation of a DLX Machine" by Mike McDonald and Tony Jacobs, available online at the following Internet location: https://www.es.umd.edu/class/padfall2001/cmsc411/projects/DLX/proj.html.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Fault injection is a widely used and highly effective (from a hacker's point of view) technique. Certain embodiments seek to provide improved protection against fault injection attacks or instruction-skip fault attacks.

Security systems are measured by their rate of false positives aka false alarms as well as the level of security they provide. Certain embodiments of the present invention, seek to provide a system which takes advantage of the fact that often, out of 100% of system operation time, there are periods of lower security risk, such as but not limited to periods which, empirically, have been observed to be less popular for hacking, and there are periods of higher security risk, such as but not limited to periods which, empirically, have been observed to be more popular for hacking. The system then restricts the time during which a system is more sensitive to security threats, to the second type of period, thereby reducing the system's susceptibility to false alarms in total, making the system more secure while not affecting availability and usability relative to placing the system in highest sensitivity to fault injection 100% of the time.

Certain embodiments seek to provide a fault injection detector having dynamic e.g. real-time adjustment of sensitivity levels which operates in real time, having a response time which is shorter than the decode-through-execution cycle of a single instruction by the CPU being secured by the fault injection detector. Typically, detection is continuous, rather than at intervals.

Turning countermeasures on and off, depending on a chip's state, e.g. depending on whether the chip is active or in a sleep state, may or may not be known in the art. Certain embodiments shown and described herein seek to adjust sensitivity levels in real time so as to fine-tune tradeoffs inherent in devices which provide attack protection at the expense of some false positives. Typically, control over countermeasures is provided at a resolution of a single opcode e.g. because a first, perhaps low-sensitivity level may be provided upon detection of a first opcode, yielding a first tradeoff which provides lower level detection and suffers from a lower level of false alarms, and a second, perhaps higher sensitivity level may be provided upon detection of an upcoming, second opcode just following the first opcode, yielding a second tradeoff which provides a higher level of detection at the cost of a higher level of false alarms.

Certain embodiments of the present invention seek to provide a security system, method and computer program product which dynamically, depending on a CPU's execution flow, controls fault injection countermeasure circuitry operative to protect the CPU from fault injection attacks. For example, a CPU or processor core may be provided which, when in use, generates, in real time, output indications of at least one conditional branch about to be executed and wherein, responsive to an output indication of a conditional branch about to be executed, the sensitivity level configuration module is operative to select a next sensitivity level which is higher than at least one sensitivity level selected by the sensitivity level configuration module if at least one instruction other than a conditional branch is about to be executed by the processor core.

There are thus provided at least the following embodiments:

Embodiment 1. A security system which dynamically, depending on processor core execution flow, controls fault injection countermeasure circuitry operative to protect the processor core from fault injection attacks, the system comprising:

i. a processor core which, when in use, executes instructions and concurrently, generates, in real time, output indications of at least some instructions which are about to be executed;

ii. a fault injection detector having plural selectable sensitivity levels; and iii. a sensitivity level control module operative, in real time,
    to receive the output indications,
    to select a next sensitivity level from among the plural selectable sensitivity levels using sensitivity level selection logic which receives at least the output indications as inputs and
    to set the fault injection detector to the next sensitivity level,
  thereby to provide fault injection countermeasure circuitry which is differentially sensitive, when protecting the processor core from fault injection attacks, depending on the output indications of the at least some instructions, avoids at least one false alarm which would result if processor core protection were provided at a sensitivity level unrelated to the output indications of the at least some instructions.

Embodiment 2. A system according to any of the preceding embodiments wherein when the sensitivity level control module receives an output indication of an individual instruction associated with a risk level R, the sensitivity level control module responsively selects a next sensitivity level which is higher than a sensitivity level selected for at least one instruction associated with a risk level lower than R.

Embodiment 3. A system according to any of the preceding embodiments wherein when the sensitivity level control module receives an output indication of an individual instruction determining a processor core return from an interrupt handler, the sensitivity level control module responsively selects a next sensitivity level which is higher than a sensitivity level selected for at least one instruction other than the individual instruction.

Typically, when the CPU finishes executing the if-statement, the sensitivity reverts to a lower level, unless the upcoming opcode indicates that the upcoming instruction about to be executed by the processor core is another conditional branch or other opcode regarding which the sensitivity level configuration module is operative to select a high sensitivity level. Generally, the output indications are signals which indicate what is about to be executed by the processor core at the current moment and the sensitivity level is set accordingly by the sensitivity level configuration module. When the output indication of the next or upcoming opcode comes along, the sensitivity level is again adjusted accordingly, hence may remain the same or change, depending on whether opcode that follows is the same as the preceding opcode (or corresponds in the logic, to a sensitivity level which happens to be the same as the level that corresponds to the previous opcode).

Embodiment 4. A system according to any of the preceding embodiments wherein when the sensitivity level control module receives an output indication of an individual instruction determining a routine return address, the sensitivity level control module responsively selects a next sensitivity level which is higher than a sensitivity level selected for at least one instruction other than the individual instruction.

Embodiment 5. A system according to any of the preceding embodiments wherein when the sensitivity level control module receives an output indication of an individual instruction determining a stop condition for a loop, the sensitivity level control module responsively selects a next sensitivity level which is higher than a sensitivity level selected for at least one instruction other than the individual instruction.

Embodiment 6. A system according to any of the preceding embodiments wherein when the sensitivity level control module receives an output indication of an individual instruction determining a processor core execution mode change, the sensitivity level control module responsively selects a next sensitivity level which is higher than a sensitivity level selected for at least one instruction other than the individual instruction.

An execution mode change may for example include changing between a privileged mode, where code is entitled to access certain restricted resources (e.g. certain memory zones, certain hardware functions or other specific resources), and a non-privileged mode, where code is not entitled to access the restricted resources.

Embodiment 7. A system according to any of the preceding embodiments wherein when the sensitivity level control module receives an output indication of an individual instruction which reads data from memory, the sensitivity level control module responsively selects a next sensitivity level which is lower than a sensitivity level selected for at least one instruction other than the individual instruction.

Embodiment 8. A system according to any of the preceding embodiments wherein the processor core comprises a memory and wherein, when the sensitivity level control module receives an output indication of an individual instruction which reads data from memory into a local storage device (e.g. a cache or register), the sensitivity level control module responsively selects a next sensitivity level which is lower than a sensitivity level selected for at least one instruction other than the individual instruction.

Embodiment 9. A system according to any of the preceding embodiments wherein when the sensitivity level control module receives an output indication of an individual instruction comprising a conditional branch, the sensitivity level control module responsively selects a next sensitivity level which is higher than a sensitivity level selected for at least one instruction other than the individual instruction.

It is appreciated that conditional branches may be associated with a high risk level since conditional branches may be attractive targets for hackers seeking a worthwhile target, in a given code, to attack. For example, a conditional branch may be an attractive target for a hacker because the branch may route the code flow either to a first option which grants an end-user secret information or to a second option which deems the end-user non-authentic hence does not provide the secret information.

Embodiment 10. A system according to any of the preceding embodiments wherein at least one output indication, pertaining to an instruction I, is generated when the processor core is about to execute instruction I thereby to provide an output indication that instruction I is about to be executed, before execution of the instruction I.

Embodiment 11. A system according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein the decode logic is further adapted to provide, before the at least one unit operates responsive to the at least one CPU-internal signal derived from the individual instruction fetched from program memory, an output indication of the individual instruction, thereby to allow the fault injection detector to be set to the next sensitivity level before the individual instruction is executed, rather than after.

Embodiment 12. A system according to any of the preceding embodiments wherein the core decodes opcodes thereby to generate signals which comprise instructions to the core's execution units and the output indications comprise signals exported from the core which are indicative of the instructions decoded from the opcodes, thereby to provide to the sensitivity level selection logic a preview of an instruction yet to be executed by the processor core.

Embodiment 13. A system according to any of the preceding embodiments wherein the signals exported from the core comprise the instructions decoded from the opcodes.

Embodiment 14. A system according to any of the preceding embodiments wherein the fault injection detector comprises an analog circuit having plural sensitivity tuning options respectively corresponding to the plural sensitivity levels.

Embodiment 15. A system according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein for all instructions decoded by the decode logic, the decode logic is further adapted to provide, before the at least one unit operates responsive to the at least one CPU-internal signal derived from the individual instruction fetched from program memory, an output indication of the individual instruction, thereby to ensure the fault injection detector is always set to each specific sensitivity level before an instruction used by the sensitivity level logic to select the specific sensitivity level is executed, rather than after.

Embodiment 16. A security method which, dynamically, depending on processor core execution flow, controls fault injection countermeasure circuitry operative to protect the processor core from fault injection attacks, the method comprising:
  i. providing a processor core which, when in use, executes instructions and concurrently, generates, in real time, output indications of at least some instructions which are about to be executed;
  ii. providing a fault injection detector having plural controllable sensitivity levels; and
  iii. in real time, using a sensitivity level control module,
    to receive the output indications,
    to select a next sensitivity level from among the plural controllable sensitivity levels using sensitivity level selection logic which receives at least the output indications as inputs and
    to set the fault injection detector to the next sensitivity level,
  thereby to provide fault injection countermeasure circuitry which is differentially sensitive, when protecting the processor core from fault injection attacks, depending on the output indications of the at least some instructions, avoids at least one false alarm which would result if CPU protection were provided at a sensitivity level unrelated to the output indications of the at least some instructions.

Embodiment 17. A system according to any of the preceding embodiments and also comprising fault injection amelioration circuitry configured to perform at least one fault injection amelioration operation, responsive to detection of a fault injection by the detector.

Embodiment 18. A method according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein the decode logic is further adapted to provide, before the at least one unit operates responsive to the at least one CPU-internal signal derived from the individual instruction fetched from program memory, an output indication of the individual instruction, thereby to allow the fault injection detector to be set to the next sensitivity level before the individual instruction is executed, rather than after.

Embodiment 19. A method according to any of the preceding embodiments wherein the core decodes opcodes by applying combinational logic thereto thereby to generate signals which comprise instructions to the core's execution units and the output indications comprise signals exported from the core which are indicative of the instructions decoded from the opcodes, thereby to provide to the sensitivity level selection logic a preview of an instruction yet to be executed by the processor core.

Embodiment 20. A system according to any of the preceding embodiments wherein the processor core includes an execution pipeline including plural consecutive instructions having at least one overlapping phase, wherein the sensitivity level selection logic provides, to the fault injection detector, an indication for selecting a sensitivity level according to at least one instruction I which, standalone, is associated with a highest fault detection sensitivity level from among the plural sensitivity levels.

The overlapping phase/s may comprise a decode phase and/or an execution phase.

Embodiment 21. A system according to any of the preceding embodiments where the at least one instruction I, once decoded, takes priority over all other instructions being decoded and takes priority over all other instructions about to be executed in that the highest detection sensitivity level is set starting immediately upon decoding of the instruction I and ending only after the instruction I has been fully executed, irrespective of the other instructions being decoded and the other instructions about to be executed.

Embodiment 22. A system according to any of the preceding embodiments wherein the processor core output indications comprise output indications of which op-code is about to be executed.

Embodiment 23. A system according to any of the preceding embodiments wherein the fault injection detector is operative to protect a CPU, whose decode-execution cycle for a single instruction is T time units long, from fault injection attacks, and wherein the fault injection detector has a response time which is shorter than T.

Embodiment 24. A system according to any of the preceding embodiments wherein the fault injection detector comprises plural fault injection detector units deployed in plural processor core locations respectively thereby to detect fault injection attacks at all of the plural locations.

Embodiment 25. A system according to any of the preceding embodiments wherein the fault injection detector alerts if at least one of the detector units, deployed at location L, detects a fault injection attack at location L.

It is appreciated that certain embodiments may, if desired, be implemented as a computer program-driven CM sensitivity control product including a computer program which is typically more real-time than the execution of the processor core to be protected thereby. There may therefore be provided a computer program product, comprising a non-transitory tangible computer readable medium having computer readable program code embodied therein, the computer readable program code adapted to be executed to implement a security method which dynamically, depending on processor core execution flow, controls fault injection countermeasure circuitry operative to protect the processor from fault injection attacks, the method comprising:

i. providing a processor core which, when in use, executes instructions and concurrently, generates, in real time, output indications of at least some instructions which are about to be executed;

ii. providing a fault injection detector having plural controllable sensitivity levels; and iii. in real time, using a sensitivity level control module,
to receive the output indications,
to select a next sensitivity level from among the plural controllable sensitivity levels using sensitivity level selection logic which receives at least the output indications as inputs and to set the fault injection detector to the next sensitivity level, thereby to provide fault injection countermeasure circuitry which, being respondent, when protecting the CPU from fault injection attacks, to the output indications of the at least some instructions, avoids at least one false alarm which would result if CPU protection were provided at a sensitivity level unrelated to the output indications of the at least some instructions. Alternatively or in addition, the fault injection countermeasure circuitry may, if the sensitivity level if set to completely avoid false alarms, detect at least one fault injection which would not be detected if CPU protection were provided at a sensitivity level unrelated to the output indications of the at least some instructions.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings:

FIG. 1 is a prior art diagram illustrating a conventional CPU operation cycle which, significantly, typically includes inter alia a process of fetching which is followed by decoding which is followed by execution.

FIG. 2 is a simplified flow diagram of a method for building a system in accordance with certain embodiments.

FIG. 4 is a simplified flow diagram of a method for real-time operation of a dynamic sensitivity-level adjustment system in accordance with certain embodiments.

FIG. 8 is a simplified diagram of a plural detector unit embodiment of the present invention.

Figure 3:
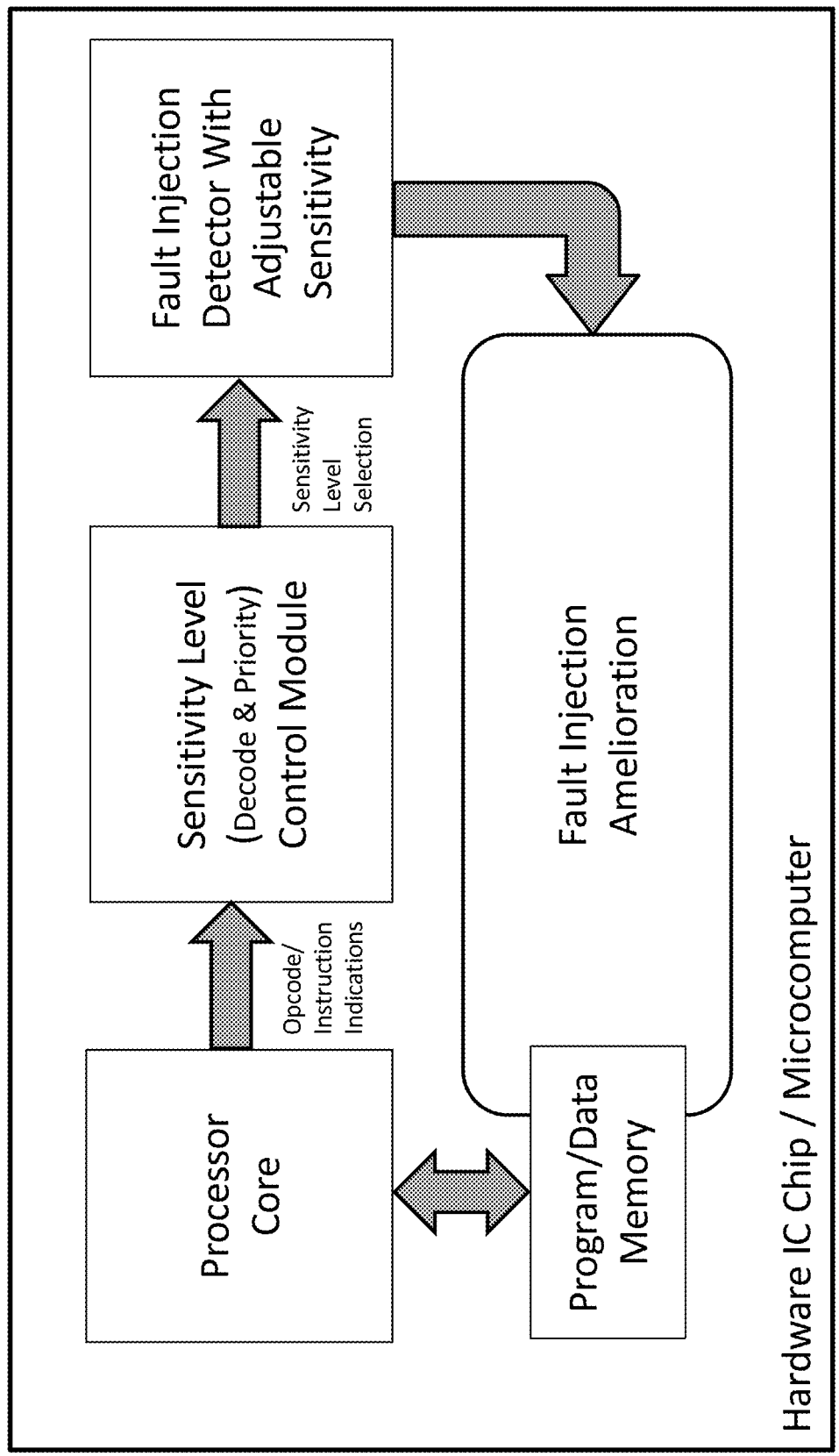
FIG. 3 is a simplified block diagram illustration of a security system according to certain embodiments, which is typically characterized in that instructions executed by a processor core or CPU become the trigger for adjusting a fault injection attack detector that is protecting that core from these attacks, e.g. execution of a conditional branch or other portion of code which is deemed at high risk of being hacked, may trigger an adjustment of the detector in real time to be more sensitive.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application if and as appropriate and which may employ any suitable architectural option such as but not limited to ASIC or DSP or any suitable combination thereof. Any hardware component mentioned herein may in fact include either one or more hardware devices e.g. chips, which may be co-located or remote from one another.

DETAILED DESCRIPTION OF CERTAIN EMBODIMENTS

"Basic Operation of a DLX Machine" by Mike McDonald and Tony Jacobs, available online at the following internet location: https://www.cs.umd.edu/class/fall2001/emsc411/projects/DLX/proj.html describes inter alia five stages of execution in the DLX architecture: Instruction Fetch (IF), Instruction Decode (ID), Execution (EX), Memory (MEM) and Write-Back (WB). Each stage takes as much time as the slowest one, even if it does not need this much time to complete. This time period is a clock cycle. Therefore, each instruction takes a total of 5 clock cycles from start to finish to execute. Each stage of execution corresponds to hardware in the CPU, as can be seen in the FIG. 3.1 of Hennessy and Patterson. Each "section" of hardware along the data path can operate concurrently which pipelining takes advantage of to gain enormous performance benefits. Very specific operations are done in each stage.
1. Instruction Fetch (IR)-Read the instruction from memory and put it into the instruction register (IR). Update the new program counter (NPC) so that it points to the next instruction (PC+4, or the next word in memory).
2. Instruction Decode (ID)-Decode the instruction (based on opcode). The output of registers (Regs[$IR_{6 \ldots 10}$]) and Regs[$IR_{11 \ldots 15}$]) from the register file is placed into temporary registers "A" and "B". Sign extend the portion of the instruction that could be an immediate value and put this value into temporary register "Imm".
3. Execution (EX)-What happens here depends on what type of instruction is about to be executed. The ALU is going to be operating in this cycle, performing the desired operation.

FIG. 1 is a prior art diagram illustrating a conventional CPU cycle which, significantly, typically includes inter alia a process of fetching, which is followed by decoding, which is followed by execution.

Systems for fault injection countermeasure sensitivity adjustment are now described in detail.

"If" statements or conditional branches are examples of CPU instructions which may be vulnerable to fault injections aka "fault injection attacks" e.g. may serve as targets for fault injections, e.g. points where the flow of a program is likely to be deliberately hacked. For example, a conditional branch may be configured either to jump to a code section which provides a user with some secret information, based on a preceding operation, e.g. conditional on the user having successfully provided user authentication in a previous operation, or jump somewhere else, or not jump at all, either of which would not provide the user with the requested information (if the user fails to successfully provide user authentication in the previous operation). In the latter case, a hacker might try injecting at a certain time, a "fault" striving to fool the conditional branch instruction into jumping to the code that does provide the secret information, even if the necessary user authentication was not provided by that user in the previous operation.

According to certain embodiments, a security system is provided in which a processor core, when in use e.g. in real time, indicates which op-code/instruction is about to be executed. For example, the CPU when fetching an instruction from program memory, typically first decodes the instruction. Decoding of the instruction typically comprises logic functions taking as input the opcode, usually in binary form (instruction opcodes typically comprise numbers stored typically sequentially as the binary code of the respective program, which may be interleaved with instruction operands) and applying logic functions (aka "decode logic") which yield CPU-internal signals adapted to operate the CPU's various units to perform respective functions, e.g. to operate the CPU's ALU to perform an arithmetic operation, and so forth. According to certain embodiments, the decode logic, may be adapted to output the decoded signals, inter alia, to a subsystem (e.g. a sensitivity-level control module) outside the CPU, to enable that subsystem, despite being external to the CPU, to take action (e.g. to select a sensitivity level) responsive to advance knowledge characterizing what the CPU is on the verge of doing at a given time.

It is appreciated that conventionally, built-in CPU decode logic is designed specifically to control the operational units of the CPU, e.g. ALU, according to the instruction being processed and the CPU does not "know" which instruction is about to be executed at any given time. In contrast, according to certain embodiments, the decode logic output typically indicates which instruction is now about to be executed. Furthermore, inside the CPU instruction may have overlapping control states. For example, two (or N) different instructions of one family may have some of the same internal controls because the two different instructions operate the same CPU blocks.

A particular advantage of adapting the decode logic to communicate with the external subsystem may be that since decoding precedes the actual performance of the decoded instruction by the relevant CPU unit (say, by the ALU), the external subsystem is being given a preview of an instruction that the CPU has yet to actually act upon.

It is appreciated that some ICs implement low-power modes. For example, an IC may enter low-power mode upon detecting that the core is executing some specific predefined instruction, such as, in some CPUs, a WAIT instruction, or some other type of HALT instruction, or a Wait-For-Interrupt, all of which may typically put the CPU's core in a hold state in which the core typically remains, waiting for an event to trigger the core's exit from that hold state. This would involve a real-time indication of which op-code/instruction is about to be executed.
b. Authentication mechanisms which operate based on tracking the execution flow of the CPU, exist, for example co-owned U.S. Pat. No. 9,703,945. The execution flow may be put on hold to authenticate the code when a specific set of instructions is executed. Specifically, U.S. Pat. No. 9,703,945 describes authentication mechanisms which operate based on tracking the execution flow of the CPU. U.S. Pat. No. 9,703,945 describes specific operations or instructions—for example, access to a certain space of memory-mapped I/O addresses-which, by the decision of the system designer, are deemed to require a greater level of security in terms of code authentication. So, upon detection of such an instruction, e.g. a write operation to that 110 address space, the execution flow is temporarily halted until a certain code authentication sequence has been completed. Once this is done, and assuming the respective code is authenticated, the execution flow is resumed and the operation carried out. So, the method, triggered by a certain instructions, alters the flow of the program to take some predefined action, namely authentication of the code.

Inter alia, U.S. Pat. No. 9,703,945 describes a processing core, which is coupled to receive program instructions from the input bridge and execute these program instructions, wherein the program instructions include both program instructions which are capable of outputting signals through the output bridge, and program instructions that do not send data to the one or more system outputs, and wherein the processing core can execute program instructions that do not send data to the one or more system outputs both when the output bridge is in the first state, and when the output bridge is in the second state. The term "sensitivity level" is intended to include any cut-off point or threshold, applied by a fault injection detector to any criterion or trigger characteristic of or correlative to fault injection which may be reacted to by the fault injection detector and used by the fault injection detector's logic to differentiate between a fault and a non-fault. Typically, a fault injection detector strives to detect differences between expected and actual reality, and each time such a difference is detected, a "fault" alert is provided.

Since different types of fault injection detectors are implemented using different mechanisms, various sensitivity control mechanisms may be employed to implement the sensitivity level, such as but not limited to the following:

a. a fault injection detector may identify sudden changes, aka glitches in the power supply voltage or the ground level in a chip. In such cases, the detector could be set to identify an abnormal condition when actual reality (the voltage actually detected) is, say, 50 mV, 100 mV or 300 mV away from an expected voltage.

b. a comparison of voltage levels may be conducted between different locations on the same logical network to detect local differences, since the expected reality is that all locations would be in the same state.

c. a light detector may be operative for attempting to identify fault injection using light energy, yielding fault injection detection based on voltage levels which correspond to the intensity of light.

It is appreciated that it is possible to compare voltage levels of digital signals which are supposed to be in the same logic state, whether 1 or 0, at any given time. In such a comparison, the triggering voltage difference as may be defined as X, Y or Z.

Also, the sensitivity need not be voltage level-based at all. Detectors with non-voltage-based sensitivity levels may for example include:

1—A detector designed to directly detect light, say laser, energy. If the detector converts light energy into voltage level proportional to the energy of light absorbed, it is possible to detect voltage levels A, B or C corresponding to light energy levels X, Y and Z respectively.

2—A detector designed to directly detect electromagnetic energy other than light. If the detector converts electromagnetic energy into voltage level proportional to the electromagnetic energy absorbed, it is possible to detect voltage levels A, B or C corresponding to electromagnetic energy levels X, Y and Z respectively.

An example of a detector with non-voltage-based sensitivity levels that does not operate in real time is a frequency deviation detector which may have plural sensitivity levels in terms of the magnitude of frequency deviation from the expected frequency. It is appreciated that the target of the fault injection may in this case comprise a chip clock which typically has a predetermined frequency (aka "expected frequency"). If, for example, the clock of a given chip has an expected frequency of 250 MHz, and a momentary deviation from that value, e.g. two clock pulses which are closer together than expected, is detected, this may be indicative of an attempt at fault injection.

Some glitch detectors may be designed with plural sensitivity levels which are selected through configuration and are predefined per a system architecture decision and pre-configured (as opposed to being configured dynamically as in embodiments of the present invention).

FIG. 2 describes a method for building a system which may receive from a processor core or CPU, an opcode indicator, makes a sensitivity level decision accordingly in real time, although optionally other factors may affect this decision as well, and then provides sensitivity level control to a countermeasure circuit, all in accordance with embodiments of the present invention.

As described, there may be situations or conditions, such as but not limited to execution of a conditional branch, which a security developer may believe introduces higher risk of hardware fault injection.

Typically, a fault is injected which eventually translates into an electrical event for the IC, and that event has the effect of disturbing the consistent and coherent operation of the IC's hardware. For example, in the case of MCU/CPU executing code, fault injection striving to disturb consistent and coherent operation of the IC's hardware would typically attempt to disturb the execution flow of the code, attacking the IC's hardware to disturb the execution of the IC's software and/or firmware.

In such cases, the security developer may want to dynamically apply a different tradeoff between security level and false alarms.

Any suitable procedure may be followed by a security developer as he goes about configuring the logic. For example, the designer may first simulate and/or operate the device across a full range of anticipated normal real-life scenarios and allowed operating conditions, to ensure that under allowed operating conditions the mechanism never (or only with acceptable rarity) triggers a false alarm. Then, the designer may operate the device, given fault injection the device is intended to withstand, and determine a fault injection detection level which triggers all or almost all fault injections properly e.g. at an accepted level of reliability. The designer can then define this "proper level" as the default detection level for detecting fault injections. The designer can then adapt the logic such that a selected higher sensitivity level (corresponding to a slightly more aggressive detection) is enabled in real time responsive to an output indication that the CPU is about to execute an instruction deemed by the designer as being associated with higher fault attack risk.

Typically, detection levels are adapted by the developer to be such that they are triggered (detect an attack) when operating conditions are indeed likely to cause the hardware to operate incorrectly. Such levels may be characterized by the developer on plural device variants to ensure little or no detection of fault injection during normal operation.

Typically it is desired to provide a circuit capable of detecting at more than one designer-defined levels e.g. at least two detection levels where one of the two levels, but not the other, intercepts mild fault injections at the risk of unnecessarily disturbing the regular operation of the device. The levels may include:

a. a first level which detects an aggressive fault injection which causes an abnormal condition (e.g. a condition which generates a risk of device malfunction); and b. a second level which detects not only the aggressive fault injections, but also non-aggressive (aka mild) fault injections, which cause a condition which, while unexpected, can be sustained by the device without malfunction.

Still referring to FIG. 2, typically, a processor is provided which produces signals indicating which instruction/opcode, or family/group of opcodes, is about to be executed at each given moment. For example, the signals may indicate that a given instruction is about to be executed by the processor, from the time the processor's decode unit identifies the subject instruction/command and until the time the execution unit indicates that the execution of the instruction/command is complete. In this embodiment, the indication encompasses both the "decode" and "execution" phases of the given instruction, however this need not be the case. Alternatively, the signals may indicate that a given instruction is about to be executed during the "execution" phase, but not during the decode phase, of the given instruction. Another possible embodiment is to keep the indication active from (and including) the "decode" phase of the subject instruction I and until (but not including) the "decode" phase of the instruction I+1 (the instruction which is performed by the processor just after the processor performs instruction I).

It is appreciated that certain control signals aka CPU-internal signals governing the above cycle are part of the CPU's internal design and nonetheless are common to all or many CPUs. For example, a. signals telling the Fetch unit to get the instruction from memory and store the instruction somewhere local, and b. signals, produced by the Decode unit, which command or tell other CPU units to operate and execute the instruction.

Also, as still shown in FIG. 2, the system designer typically associates at least one opcode or group of opcodes, with an associated security risk. Typically, conditional branch opcodes are associated with a high risk R (R may be a scalar) relative to some or all opcodes other than conditional branch opcodes which are associated with a risk lower than R. This is because conditional branch instructions control the flow of the program and are therefore points where fault injection could divert the program from the correct and orderly flow.

Alternatively or in addition, according to certain embodiments, a detailed risk analysis may be used to gain an understanding of the relative risk associated with various different opcodes.

To conduct risk analysis, a designer may study the processor's instruction set. An example description of an instruction set (of the ARM Cortex-M0) is available on the web, at the following link: http://infocenter.arm.com/help/index.jsp?topic=/com.arm.doc.ddi0432c/CHDCICDF.html.

At least to a certain extent, such analysis may be generalizable between processors since instructions sets tend to be similar between processors, at least between similar types of processors such as between RISC processors or between CISC processors. For example, many processors may have all or most of the following types or groups of instructions:

1. Memory and register handling—commonly including load, store and move instructions.
2. Arithmetic and logic manipulations—commonly including add, subtract, sometimes multiply and divide or arithmetic shifts, and logical operations such as Or, And, Xor.
3. Stack management—typically push/pop.
4. Branch—conditional and non-conditional.
5. Control—such as but perhaps not limited to state management, interrupt management.

Nonetheless, at last some per-processor risk analysis may be conducted since each specific processor does tend to have an at least somewhat different instruction set than other processors.

The designer may also review the application and how it is implemented (including analysis of the application's code) and may quantify risk of specific instructions or types of instructions, accordingly. For example:

a. A stack management instruction may be deemed high-risk relative to at least one instruction other than stack management instruction (and/or relative to the risk level associated with at least one instruction in at least one of the instruction groups 3-5 above and/or relative to op-codes deemed as low risk) e.g. because stacks may also have a role in program flow, specifically when subroutine calls are involved; stacks typically keep return addresses, so manipulating them through fault injection may also divert programs from the orderly execution flow.

b. In the Arithmetic/Logic group (group 2 above), based on analysis of the code, a system designer may find that specific arithmetic instructions are used in "critical" places in the code which affect program flow and/or code "decision making". Those specific instructions could be associated with a high risk e.g. a risk that is higher than arithmetic instructions in the code which are not in such critical places or higher than the risk level associated with at least one instruction in at least one of the instruction groups 3-5 above and/or higher than op-codes deemed as low risk.

Also, and still as shown in FIG. 2, there is a fault injection detector with L=at least two sensitivity levels—one which is more tolerant (has a lower sensitivity level) and another which is more sensitive (has a higher sensitivity level).

Figure 5:
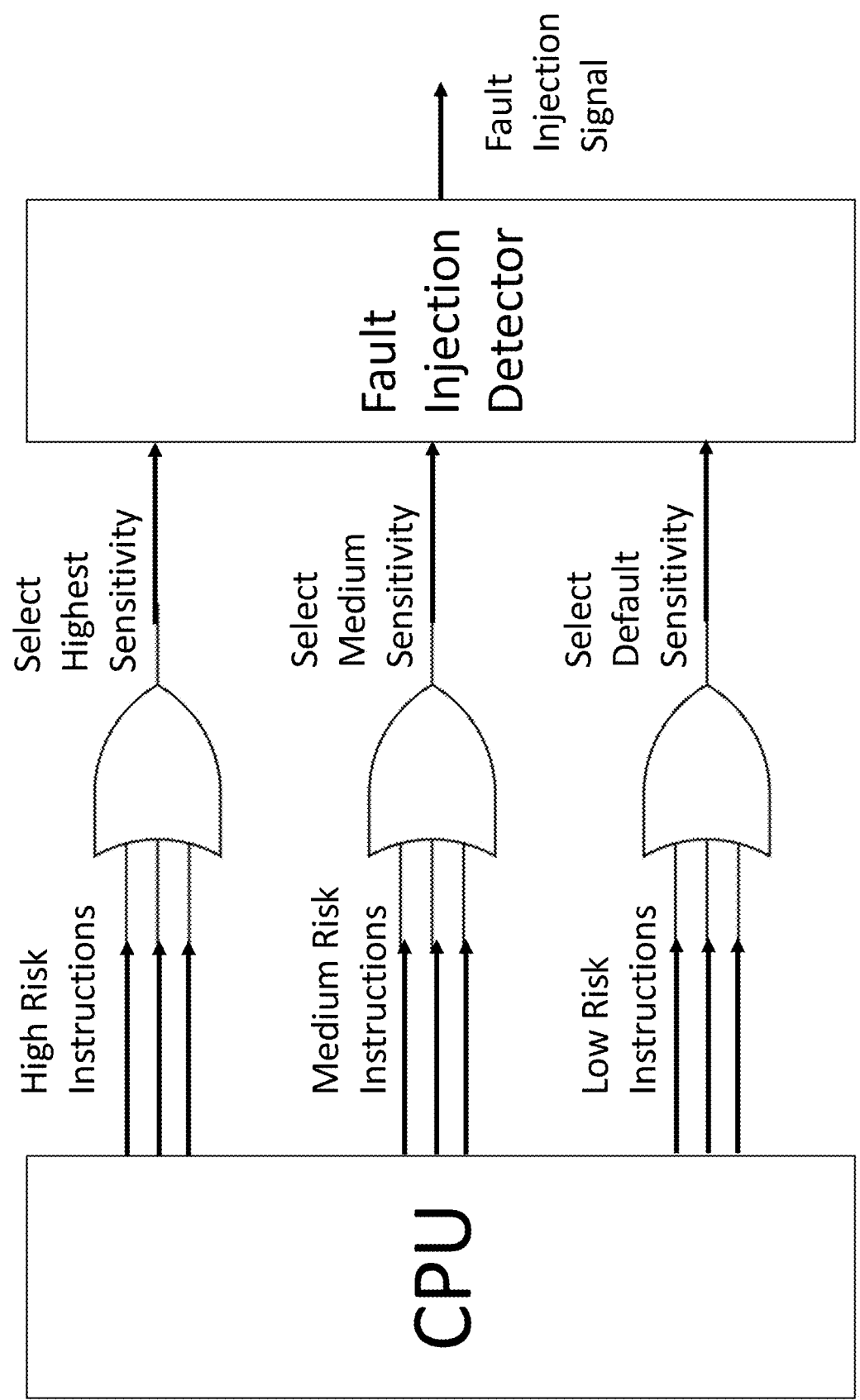
FIG. 5 is a diagram of an example dynamic sensitivity-level adjustment system showing 3-level sensitivity including a lowest sensitivity level which is defined as the default level, and two additional levels, both higher than the default level, all in accordance with certain embodiments.

Also, and still as shown in FIG. 2, dynamic sensitivity-level adjustment (e.g. selection of one of the L levels in real time) may be implemented in any suitable manner. For example, decode logic may be provided which receives those signals from the processor, and according to the security risk rating of the opcodes, produces corresponding signals to indicate to the fault injection detector at any time whether it should trigger, based on the tolerant or the more sensitive detection level. An example implementation, showing 3-level sensitivity including a lowest sensitivity level which is defined as the default level, and two additional levels both higher than the default level, is shown in FIG. 5.

According to certain embodiments, the indication to the detector goes off right after or immediately upon decoding the instruction such that the detector gets a signal before execution of that instruction by the core starts. Detection circuits typically do not, themselves, "reject" or absorb or otherwise handle the fault injection. However, the circuits do raise a flag to indicate that a fault injection came in, allowing other modules to respond in any suitable manner, such as but not limited to reverting the device (e.g. CPU or processor) to a known state and the program to a known point in the flow. Such reverting may occur relatively slowly e.g. only after the fault injection has occurred, however, this is acceptable since damage from a fault injection occurs not immediately, but rather only when a place in the code is reached, that should not have been reached, and indeed would not have been reached were it not for the fault injection. Reverting occurs before this place in the code is reached.

The method of FIG. 2 typically comprises some or all of the following operations, suitably ordered e.g. as follows:

Operation 1. provide processor core/CPU which is vulnerable to fault injection and which produces signals indicating which instruction/opcode, or family/group of opcodes, is executed at any given moment.

Operation 2. risk analysis: system designer associates security risk e.g. risk of fault injection to a list of opcodes or groups of opcodes and generates sensitivity level decision/selection logic accordingly. For example: conditional branch opcodes—high risk; all other opcodes—low risk.

Operation 3. provide fault injection detector with at least two sensitivity levels.

Operation 4. implement sensitivity-level adjustment of CM circuit e.g. provide a CM circuit whose sensitivity level is adjustable in real time, say by dynamic selection of one of the at least two levels. Typically, the fault injection detector supports dynamic e.g. real-time adjustment of sensitivity levels which operates in real time and has a response time which is shorter than the decode-execution cycle of a single instruction by the processor or CPU being secured by the fault injection detector.

The response time is typically shorter as above, because it is typically desired that the time period during which the control signals propagate through the sensitivity control unit to the detector leave enough time for the detector to react. For example: if the instruction cycle is 40 ns long, then the time which elapses from the indication of the opcode and until the detector is set at the required sensitivity level is, say, up to 10 ns, leaving a 30 ns time window in which the detector may react.

Turning now to FIG. 3, it is appreciated that conditional execution and conditional branches, i.e. software decision points, are regarded as weak points in security code i.e. points which are prone to fault injection attacks. FIG. 3 is a simplified block diagram illustration of a security system according to certain embodiments, which may for example be provided in accordance with the method of FIG. 2. The system of FIG. 3 typically comprises:

A processor core or CPU having op-code or other code indications, indicating the execution of specific instructions or categories of instructions, such as but not limited to conditional branch, specific comparisons, etc.; and A CM circuit e.g. an electrical countermeasure circuit including a fault injection detector designed with multiple, controllable sensitivity levels. The circuit may comprise fault injection amelioration circuitry in conjunction with the fault injection detector having adjustable sensitivity. The fault injection amelioration circuitry is actuated if the fault injection detector detects a fault injection e.g. is triggered each time the fault injection detector detects a fault injection.

Design issues regarding certain examples of such circuitry are described for example in the following white papers, both available on the web:
Compilation of a Countermeasure Against
Instruction-Skip Fault Attacks
Thierno Barry, Damien Courouss_e, Bruno Robisson and:
Low-Cost Software Countermeasures Against Fault
Attacks: Implementation and Performances Trade Offs.

It is appreciated that the term "countermeasure" is used generally to refer to detectors and/or modules for ameliorating (e.g. preventing or rectifying) ill-effects of fault injection attacks. In the context of FIG. 3, the CM circuit detects such attacks and triggers any suitable module for preventing or rectifying ill-effects of such attacks.

According to one embodiment, the security system, having identified the execution of a conditional branch, will adjust the detection level of the respective circuit to be more sensitive.

It is appreciated that various instructions or categories thereof may be considered to introduce a higher risk of fault injection than instructions which are not so considered. To give some non-limiting examples, any or all of the following op-codes may be deemed to introduce a higher risk of fault injection (which may result in a system design decision to associate any or all of the following opcodes with a high security risk (highly at risk for fault injection e.g.) i.e. a risk level which is higher than that associated with opcodes other than the following, and/or to provide logic which increases the sensitivity level of the fault injection detector when such instructions are encountered):

a. Opcodes indicative of a conditional branch, for example, branch-if-equal, branch-if-not-equal are RISC CPU branch instructions based on a comparison between two operands which precede the conditional branch and produce "results" used subsequently by the conditional branch to decide whether to branch or continue sequentially.

b. Opcodes performing comparisons or other "tests", which result in setting various flags, which are then used by logic which "decides" whether to take a given conditional branch or not.

For example, a compare instruction may be operative for comparing two operands and setting a flag in the event that the two are equal (or in the event that the two are not equal). A subtract operation may set a flag in the event that the result is negative or nonzero, to compare operands, e.g. numbers.

c. Opcodes pushing specific types of information into the processors stack, e.g. return address of critical or sensitive information or data or CPU subsystem flags later used for conditional operations.

d. Opcodes which are characterized to be used as implementing the stop conditions of loops. For example, loops are described in: https://www.tutorialspoint.com/assembly_programming/assembly_loops.htm The "loop" instruction as described assumes that the loop counter is kept in a predefined CPU register. When the CPU encounters a "loop" instruction, the CPU may decrement the loop counter, compare the loop counter to zero, and return to the beginning of the loop if the counter is greater than or equal to zero, thereby to implement a loop stop condition.

In some cases, it may not be known in advance which instructions are used e.g. because instructions used may depend on CPU-specific compiler choices. For example, a CPU may have a built-in instruction made for looping, which deals with a designated register or variable, automatically increases and decreases that register or variable, and then jumps back to the beginning of the loop if the loop counter so stipulates, or lets the program continue sequentially if the loop counter has elapsed.

It is appreciated that various instructions or categories thereof may be considered to introduce a particularly low risk of fault injection, relative to instructions which are not so considered. To give some non-limiting examples, any or all of the following may be considered to introduce a particularly low risk of fault injection (which may result in a system design decision to associate any or all of the following opcodes with a low security risk i.e. a risk level which is lower than that associated with opcodes other than the following, and/or to provide logic which reduces the sensitivity level of the fault injection detector when such instructions are encountered, thereby to cut down on false positives with little or no adverse effect):

a. Load opcodes which just read data from memory or
b. Store opcodes which just store data in memory While fault injection might cause the above to malfunction, it may be regarded as practically impossible for a hacker to define an effective attack based on disturbing specific store/load instructions.

FIG. 4 is an example method of operation in accordance with certain embodiments; e.g. of a system provided in accordance with the method of FIG. 2 and/or the system of FIG. 3.

The method of FIG. 4 is typically operative in conjunction with a core executing instructions, where indications are provided and decoded and used to select, in real time, a sensitivity level for a fault injection detector. Typically, a given sensitivity level is associated with each of plural instructions or groups/sets of instructions. Typically, the designer of the system associates higher sensitivity levels with instructions deemed, according to the designer's risk assessment, to suffer from higher risk level/s e.g. deemed to be attractive targets from the viewpoint of a hacker seeking a suitable target location for a fault injection attack, and conversely, lower sensitivity levels with instructions deemed to suffer from lower risk level/s. The system using the method of FIG. 4 is typically structured such that instructions are decoded and responsive, in real time. Instructions are set to sensitivity levels associated with or corresponding to instructions just decoded, and about to executed. Typically, then, sensitivity levels are set in the time window between decoding of an instruction and execution thereof by the core.

The method of FIG. 4 typically includes some or all of the following operations, suitably ordered e.g. as shown:

310. CPU provides opcode indicator I to sensitivity level decision logic (aka sensitivity level selection logic) employed by sensitivity level control module.

320; sensitivity level decision logic generates a decision: CM circuit's sensitivity level should be L_I 330. sensitivity level control module signals (or commands) sensitivity level control module to adjust CM circuit's sensitivity level to L_I 340: responsively, sensitivity level control module issues a sensitivity level control signal to the CM circuit 350: CM circuit adjusts its sensitivity level to L_I. The level may, for example, be adjusted using a suitable selector element whose controls comprise, or are derived from, the sensitivity level control command which are indicative of which opcode is about to be executed.

Figure 6:
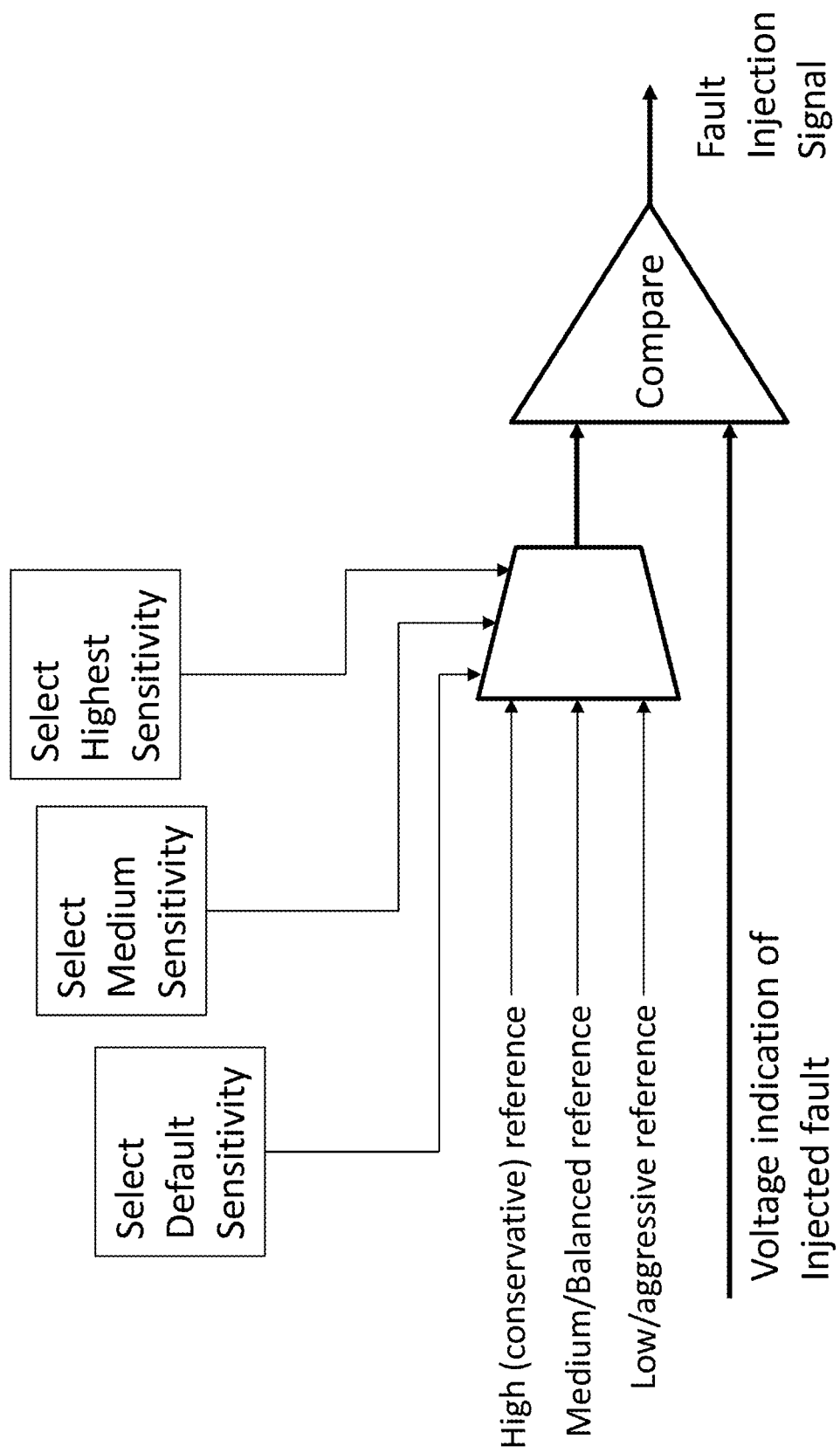
FIG. 6 is an example implementation of the fault detector of FIG. 5.

FIGS. 5-6 are 3-level examples of a dynamic sensitivity-level adjustment system according to certain embodiments. The design of the device is analyzed in advance, including risk categorization, and then, during operation, the detector responds in real time based on a priori risk categorization.

Specifically, FIG. 5 is a diagram of an example dynamic sensitivity-level adjustment system showing 3-level sensitivity, including a lowest sensitivity level which is defined as the default level, and two additional levels, both higher than the default level. FIG. 6 is an example implementation of the fault detector of FIG. 5.

Figure 7:
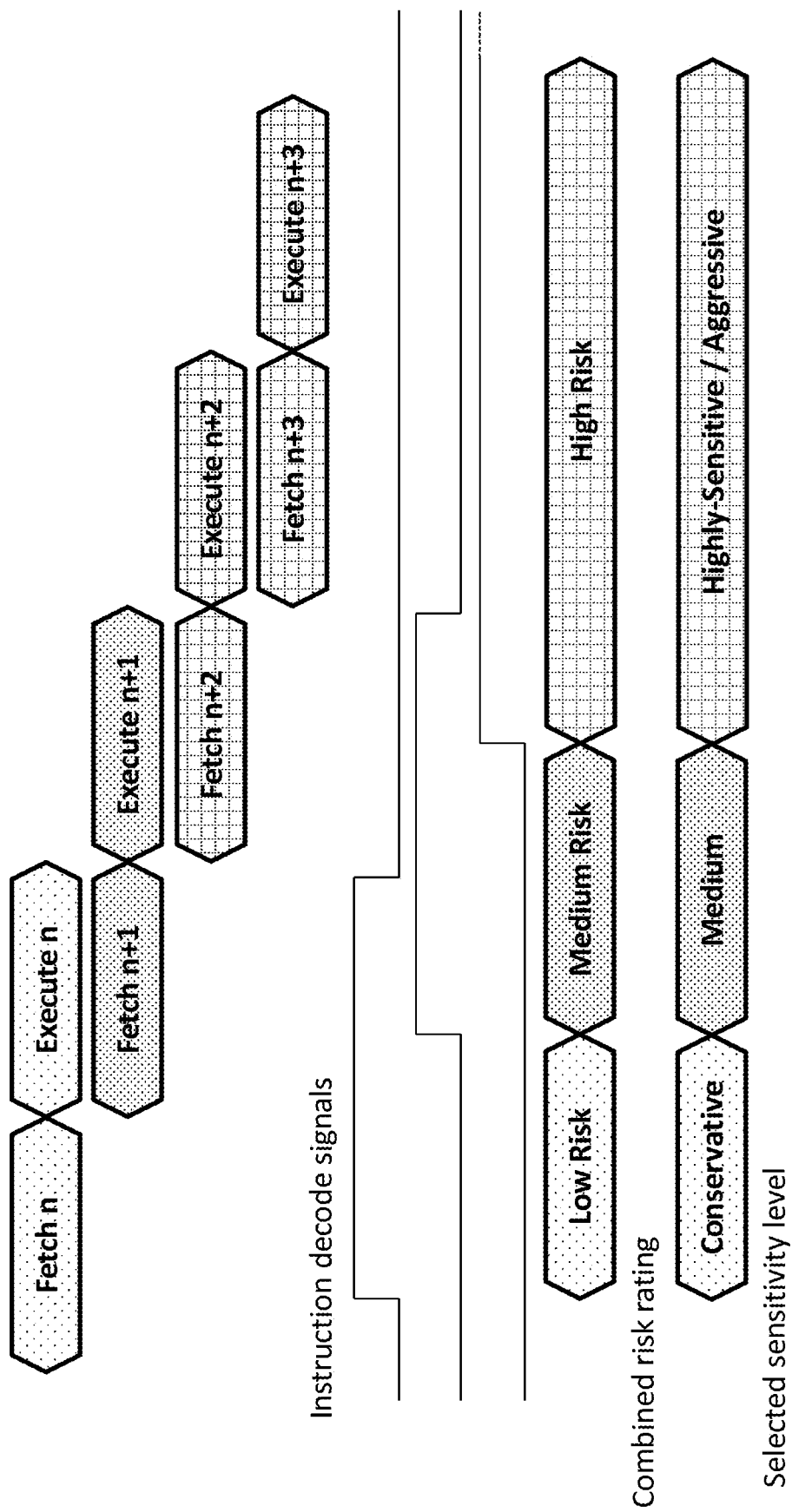
FIG. 7 is an example 3-level waveform diagram showing instruction decode signals, combined risk rating (e.g. low, medium or high) and selected sensitivity level (e.g. conservative, medium or aggressive/highly sensitive); it is appreciated that any number of levels other than three may alternatively be employed.

FIG. 7 is an example 3-level waveform diagram showing instruction decode signals, combined risk rating (e.g. low, medium or high) and selected sensitivity level (e.g. conservative, medium or aggressive/highly sensitive); it is appreciated that any number of levels other than three may alternatively be employed, and there need not be a default level as shown.

In the example execution pipeline for the CPU, as shown, if the pipeline is processing, say, one "low-risk" instruction and one "high-risk" instruction, the high-risk instruction, once decoded, takes priority in setting the sensitivity level of the detector. For example, at the point where the "medium-risk" fetch comes in, the sensitivity increases as soon as (just after) the instruction is decoded. Similarly, when the "high-risk" fetch comes in, as soon as the instruction is decoded, the sensitivity immediately increases yet further. More generally, when the system of FIG. 7 recognizes an instruction which is of higher risk than the current setting, the newly decoded (higher) risk takes priority until the CPU finishes processing the high-risk instruction, then reverts back to the instruction previously handled.

It is appreciated that "fetch" e.g. in FIG. 7 includes "decode", for brevity, hence "fetch" in the diagram may be interpreted as "fetch and decode".

Reference is now made to FIG. 8. According to certain embodiments, the fault injection detector comprises plural fault injection detector units deployed in plural processor core locations respectively, e.g. as shown in the example of FIG. 8, thereby to detect fault injection attacks at all of the plural locations while taking into account the locality-dependent nature of certain conventional fault injection detectors. The fault injection detector may alert (and/or may trigger fault injection amelioration operation/s applied to location L) if at least one of the detector units, deployed at location L, detects a fault injection attack at location L. Thus an OR function (or any other suitable logical function) may be used to combine fault injection detection determinations made by individual ones of the plural units. Any suitable number of units may be provided, with any suitable distance between them, typically determined as a function of, inter alia, at least one of the following factors: IC die area occupied by each of the units, physical characteristics of the IC circuit being protected, and spatial characteristics of anticipated fault injection attacks.

FIG. 8 is a simplified diagram of plural fault injection detector units deployed at various processor core locations and occupying plural IC die areas respectively, according to certain embodiments of the invention.

Use cases, for certain embodiments of the present invention, abound.

For example, co-owned U.S. Pat. No. 9,521,736 describes detecting a difference in state between different branches of a given electrical network. An electrical logical network in an IC is typically expected to be in the same state e.g. logic state of either 1 or 0, through all branches. Therefore, when a difference in voltage level is detected between two physical points on the same logical (electrical) network, it is likely to indicate an attempt of fault injection causing a local change. A designer may decide that a difference between that locality and other places of, say, 50 mV between two points, is normal, as opposed to a difference of 300 mV which is sufficiently abnormal as to risk IC functionality, and a 200 mV difference which, although abnormal, is not deemed risky. According to certain embodiments, rather than merely designing a detector targeting 300 mV, the detector may, by virtue of control, as described herein, detect either a difference of 200 mV or a difference of 300 mV, depending on a varying level of sensitivity e.g. in real time, set control signals may be sent to the detector to set the detector either to the 200 mV sensitivity level, or to the 300 mV level. Thus, the system in real time determines whether to consider 50 mV or 200 mV or 300 mV as a difference, where positive detection of a difference indicates that a fault injection has been detected.

It is appreciated that there may be other use-cases other than, or more general than, fault injection risk that would justify adjustment of sensitivity level in real time. For example, hackers are believed to study and characterize the sensitivity of a given device they are targeting, to fault injection. This might precede focused attempts on the part of the hacker to inject faults at very specific times and/or at specific device locations. Changing sensitivity level in real-time, randomly or in accordance with risk detected in real time e.g. by associating specific instructions with specific levels of risk, as described herein, may confuse or disturb such study.

Alternatively or in addition, the sensitivity level could be increased if, in real time, during a certain period of operation, the device detects a large (over-threshold) number of fault injection attempts e.g. more than X detections over a Y period of time. For example, out of 100% of system operation time, there may be periods of lower security risk, such as but not limited to periods which, empirically, have been observed to be less popular for hacking, and there may be periods of higher security risk such as but not limited to periods which, empirically, have been observed to be more popular for hacking.

Time-stamped events of detected fault injections may be recorded, after which suitable code may keep track of fault injections over time and identify outlying periods of time with particularly high or with particularly low fault injection incidence.

It is appreciated that the fault detector herein may be integrated into larger systems, thereby improving their operation.

For example, it is appreciated that the embodiments shown and described herein need not serve as the only line of defense making conditional branch operations more difficult to hack. On the contrary, the fault detector herein may be usefully combined with conventional anti-hacking techniques for combatting vulnerability to fault injections, at the code level, for example:

a. by preventing or impeding or reducing occurrence or incidence of fault injection and/or
b. by evading or ameliorating the impact of fault injection, once it occurs, either of which may be triggered by the fault injection detection technologies shown and described herein.

Any method shown and described herein for detecting a fault injection may be employed, and may augment or replace a legacy fault injection detection technology used in a legacy system which includes a module operative for evading or ameliorating the impact of fault injection, once detected. For example, the module may be activated when triggered by either of two or several fault injection detectors.

Typically, category b requires the fault injections to be detected. Therefore, any anti-hacking measure in category b may be improved upon by using the improved, dynamically controlled fault injection detection method shown and described herein. Once a fault injection has been detected, e.g. as shown and described herein, any suitable fault injection impact amelioration operation may be triggered thereby and may be performed responsively, to ameliorate e.g. rectify at least one impact e.g. ill-effect of fault injection, such as but not limited to modules adapted for:

a. Putting the device in an irreversible state, preventing any further options
b. Causing the processor to jump to a designated routine which, say, performs an overall integrity check and then, typically, resets or re-initiates the CPU.
c. Putting the processor in an endless loop until being reset by a watchdog timer.
d. Halting the device until a certain amount of time has elapsed.
e. Raising the sensitivity level for a certain amount of time after which the sensitivity reverts to default in case of no further detection.
f. Disabling specific predesignated "risky" functions for a certain duration of time. Risky functions may be approval of authentication, disclosure of sensitive data, disclosure of crypto key.
g. Halting the system until, say, a power cycle is applied or until system or device hardware is reset; watchdog timer reset or any other stopping criterion or mechanism for releasing a stuck CPU.

It is appreciated that the above fault injection amelioration operations are merely exemplary of the functionalities that may be provided for modules designed to ameliorate ill-effects of fault injection attacks. Amelioration operations or functionalities may include preventing or impeding or reducing occurrence or incidence of fault injection and/or evading or ameliorating the impact of fault injection, once it occurs. It is appreciated that amelioration operation/s may be implemented in hardware and/or in software and may utilize the program/data memory of the processor core.

It is appreciated that more than one such fault injection amelioration operation may be performed. For example, perhaps operation e above would be combined with one of operations a-d or f-g.

Implementing A Sequence Of Conditional Branches: For example, one technique among many such, for making fault injection more difficult, hence less likely e.g. as per category a above, is to repeat the conditional branch n>1 times, e.g. twice (n=2) in which case the first branch jumps to a second branch which is the one which jumps to the final destination, both branches in the n=2, or more generally all n branches, being based on the same condition. This addresses vulnerability because here, for the branch to be hacked, a single fault would not suffice, and instead, a fault would need to be injected at each of two or more generally n points, which increases the level of complexity of hacking the subject execution flow. It is appreciated that the embodiments shown and described herein may, if desired by a system designer, be combined with other anti-hacking measures (e.g. any suitable measures to ameliorate e.g. rectify at least one impact e.g. ill-effect of fault injection) thereby, together, making conditional branch operations even more difficult to hack. The above technique of Implementing A Sequence Of Conditional Branches thereby to impede fault injection by making fault injection more difficult, hence less likely, may for example be combined with any suitable technique for ameliorating the impact or ill-effects of fault injection, a technique which may, for example, include detecting fault injections using any of the embodiments shown and described herein, and then, if and when a fault injection is detected, implementing any suitable fault injection impact amelioration measure.

One known technique for better detecting fault injections (and hence better ameliorating the effect thereof e.g. by halting the system until, say, a power cycle is applied) is described in co-owned U.S. Pat. No. 9,523,736 which describes an apparatus for detecting fault injection which includes a high-fanout network which spans an Integrated Circuit (IC), and circuitry. The high-fanout network may be continuously inactive during functional operation of the IC, and the circuitry may be configured to sense signal levels at multiple sampling points in the high-fanout network, and to identify a fault injection attempt by detecting, based on the sensed signal levels, a signal abnormality in the high-fanout network. The circuitry may be configured to sense signal levels at multiple sampling points in the high-fanout network, to distinguish, based on the sensed signal levels, between legitimate signal variations and signal abnormalities in the high-fanout network during functional operation of the IC, and to identify a fault injection attempt by detecting a signal abnormality. The circuitry may be configured to modify one or more of the signal levels in the high-fanout network, in response to identifying the fault injection attempt. A control unit or sensor 48 may modify the signal level on network root 40 or on another branch of the high-fanout network (e.g., force the signal to be active) due to assertion of an ALERT signal.

Another example is detection of hardware glitches e.g. glitches to power/ground in an IC induced by an external e.g. electromagnetic source of energy. Fault injection via power glitches is a known method for hacking IC devices. Electromagnetic (EM) glitches have for years been considered an effective fault injection technique for achieving physical attacks against ICs. Circuits for detection of hardware glitches which are indicative of fault injection vulnerability and which "suffer from" a tradeoff between security level and false alarms, aka false positives include, for example, those available by Internet at the following locations: http://ieeexplore.ieee.org/document/5376828; http://www.blackhat.com/docs/eu-15/materials/eu-15-Giller-Implementing-Electrical: Glitching-Attacks.pdf: Zussa, L, et al, "Efficiency of a glitch detector against electromagnetic fault injection" http://ieeexplore.iceee.org/document/6800417/

State of the art knowledge regarding fault injection attack detectors is described in "Cheap & Cheerful: A Low Low-Cost Digital Sensor for Detecting laser fault injection attacks", dated 16 Dec. 2016, and available via Internet at http://www-users.math.umn.edu/-math-sa-sara0050/space16/slides/space2016121602-37.pdf. The proposed solution is tunable ("This sensor has bi-directional detection capability with tunable sensitivity at back-end stage"). As indicated elsewhere as well, the disclosure of this document, and indeed all documents referenced herein, is hereby incorporated by reference.

It is appreciated that the above detectors may be improved by using embodiments herein to add opcode-responsive dynamic sensitivity level adjustment. The CPU design in the above "cheap and cheerful" disclosure, being tunable, may be adapted to provide output signals indicating the instruction about to be executed at any time. For example, multiple tunings selectable at real time may be embedded in the design, or plural circuits may be added, each with different tuning, where only one output of only one of the plural circuits is selected in real time, depending on the sensitivity level indicated by the decision logic shown and described herein.

Generally, any of the fault injection attack countermeasures known in the art are for example described in the following:
Compilation of a Countermeasure Against Instruction-Skip Fault Attacks" by Thierno Barry, Damien Courouss_e, Bruno Robisson and available via Internet at https://bal-cea.archives-overts.fr/cea-01296572/document: and "Low-Cost Software Countermeasures Against Fault Attacks: Implementation and Performances Trade Offs" and available via Internet at http:euler.ees.umass.edu/research/bpbk-WESS-2010.pdf may co-exist with embodiments of the present invention, as complementary detection/protection layers. These together enhance the total degree of protection of a CPU or similar device, from attacks e.g. fault injection attacks.

It is appreciated that analog circuits are often designed with tuning options e.g. with multiple detection levels/thresholds because it may be difficult to predict in advance which levels/thresholds will work best in the environment of a real electrical system. Once in silicon, conventionally, testing is performed to determine which configuration works best, and then the circuit may be configured to the one specific "optimal" or best workable setting according to certain embodiments, rather than configuring to a single testing-selected setting. Instead, all, or more than one, of the plural settings are retained, and control circuitry is added to select, in real time, which of the plural settings to use as shown and described herein. Testing may then be conducted simply to reconfirm the performance of the circuit in real silicon.

A particular advantage of the embodiments shown and described herein is the advantage of making the tradeoff between the fault injection detection's security level and false-positive level highly adjustable, even at the granularity of a single opcode. This allows the tradeoff to be overcome to no small extent, by restricting necessary but regrettable high tolerance of false-positives (or of low security level) only to those opcodes which require such high tolerance, and desirably lowering the tolerance of false positives (or of low security level) for all opcodes which do not require such high tolerance.

It is appreciated that the particular embodiments herein are not intended to be limiting. The invention is intended to include for example any embodiments operative in conjunction with CPUs or processors which have, on the inside, signals which are the result of decoding of instructions about to be executed. According to these embodiments, these signals are sent out of the CPU, thereby to allow at least one operative unit outside the CPU to act based on these signal's states, thereby to utilize signals available in one context and designed for CPU-internal purposes for another, typically CPU-external purpose in a typically CPU-external location or context. For example, responsive to real time indication/s of which op-code/instruction is about to be executed, a sensitivity level control module in the security system may adjust, on the fly e.g. in real time, the sensitivity level (aka security level) of fault injection detector functionality in countermeasure circuitry operative to counter fault injection attacks.

Firmware, if used to implement certain embodiments herein, may be held in nonvolatile memory, e.g. Flash or ROM. Any suitable technology may be used to prevent limitations of the location of the firmware from interfering with flash management.

Alternatively, certain embodiments described herein may be implemented partly or exclusively (i.e. without firmware) in hardware in which case some or all of the variables, parameters, sequential operations and computations described herein may be in hardware.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view"

from any other node of the system, of the entire functionality of the system, computer-readable medium, apparatus, including only those functionalities performed at that server or client or node. Features may also be combined with features known in the art and particularly, although not limited to those described in the Background section or in publications mentioned therein. Conversely, features of the invention, including operations, described for brevity in the context of a single embodiment or in a certain order may be provided separately or in any suitable subcombination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

The invention claimed is:

1. A security system which dynamically, depending on processor core execution flow, controls fault injection countermeasure circuitry operative to protect said processor core from hardware fault injection attacks, the system comprising:
   a processor core which, when in use, executes instructions and concurrently, generates, in real time, output indications of at least some instructions which are about to be executed; and
   hardware fault injection countermeasure circuitry operative to protect said processor core from hardware fault injection attacks which is differentially sensitive, when protecting the processor core from hardware fault injection attacks, including:
      a hardware fault injection detector having plural sensitivity levels which are selectable in real time; and
      a sensitivity level control module operative, in real time, to:
         receive said output indications,
         select a next sensitivity level from among said plural selectable sensitivity levels using sensitivity level selection logic which receives at least said output indications as inputs, and
         set the hardware fault injection detector to said next sensitivity level,
   thereby to provide hardware fault injection countermeasure circuitry which is operative to protect said processor core from hardware fault injection attacks and wherein said circuitry is differentially sensitive, when protecting the processor core from hardware fault injection attacks, depending on said output indications of said at least some instructions, or avoids at least one false alarm which results when processor core protection is provided at a sensitivity level unrelated to said output indications of said at least some instructions
   wherein said fault injection detector comprises an analog circuit having plural tuning options respectively corresponding to said plural sensitivity levels.

2. The system according to claim 1 wherein when the sensitivity level control module receives an output indication of an individual instruction associated with a risk level R, the sensitivity level control module responsively selects a next sensitivity level which is higher than a sensitivity level selected for at least one instruction associated with a risk level lower than R.

3. The system according to claim 1 wherein when the sensitivity level control module receives an output indication of an individual instruction determining a processor core return from an interrupt handler, the sensitivity level control module responsively selects a next sensitivity level which is higher than a sensitivity level selected for at least one instruction other than said individual instruction.

4. The system according to claim 1 wherein when the sensitivity level control module receives an output indication of an individual instruction determining a routine return address, the sensitivity level control module responsively selects a next sensitivity level which is higher than a sensitivity level selected for at least one instruction other than said individual instruction.

5. The system according to claim 1 wherein when the sensitivity level control module receives an output indication of an individual instruction determining a stop condition for a loop, the sensitivity level control module responsively selects a next sensitivity level which is higher than a sensitivity level selected for at least one instruction other than said individual instruction.

6. The system according to claim 1 wherein when the sensitivity level control module receives an output indication of an individual instruction determining a processor core execution mode change, the sensitivity level control module responsively selects a next sensitivity level which is higher than a sensitivity level selected for at least one instruction other than said individual instruction.

7. The system according to claim 1 wherein when the sensitivity level control module receives an output indication of an individual instruction which reads data from memory, the sensitivity level control module responsively selects a next sensitivity level which is lower than a sensitivity level selected for at least one instruction other than said individual instruction.

8. The system according to claim 1 wherein the processor core comprises a memory and wherein, when the sensitivity level control module receives an output indication of an individual instruction which reads data from memory into a local storage device (e.g. a cache or register), the sensitivity level control module responsively selects a next sensitivity level which is lower than a sensitivity level selected for at least one instruction other than said individual instruction.

9. The system according to claim 1 wherein when the sensitivity level control module receives an output indication of an individual instruction comprising a conditional branch, the sensitivity level control module responsively selects a next sensitivity level which is higher than a sensitivity level selected for at least one instruction other than said individual instruction.

10. The system according to claim 1 wherein at least one output indication, pertaining to an instruction I, is generated when the processor core is about to execute instruction I thereby to provide an output indication that instruction I is about to be executed, before execution of said instruction I.

11. The system according to claim 1 wherein the processor core includes adapted decode logic which at least once decodes an individual instruction fetched from program memory thereby to derive at least one CPU-internal signal which subsequently operates at least one unit of the CPU thereby to execute said individual instruction, and wherein the decode logic is further adapted to provide, before the at least one unit operates responsive to the at least one CPU-internal signal derived from said individual instruction fetched from program memory, an output indication of said individual instruction, thereby to allow the fault injection detector to be set to said next sensitivity level before said individual instruction is executed, rather than after.

12. The system according to claim 1 wherein the processor core decodes opcodes thereby to generate signals which comprise instructions to the processor core's execution units and said output indications comprise signals exported from the processor core which are indicative of said instructions decoded from said opcodes, thereby to provide to the sensitivity level selection logic a preview of an instruction yet to be executed by the processor core.

13. The system according to claim 12 wherein said signals exported from the processor core comprise said instructions decoded from said opcodes.

14. The system according to claim 1 wherein the processor core includes adapted decode logic which at least once decodes an individual instruction fetched from program memory thereby to derive at least one CPU-internal signal which subsequently operates at least one unit of the CPU thereby to execute said individual instruction, and wherein for all instructions decoded by the decode logic, the decode logic is further adapted to provide, before the at least one unit operates responsive to the at least one CPU-internal signal derived from said individual instruction fetched from program memory, an output indication of said individual instruction, thereby to ensure the fault injection detector is always set to each specific sensitivity level before an instruction used by said sensitivity level logic to select said specific sensitivity level is executed, rather than after.

15. The system according to claim 1 and also comprising fault injection amelioration circuitry configured to perform at least one fault injection amelioration operation, responsive to detection of a fault injection by said detector.

16. The system according to claim 1 wherein the processor core includes an execution pipeline including plural consecutive instructions having at least one overlapping phase, wherein at least one overlapping phase comprises a different stage of the pipeline, wherein the sensitivity level selection logic provides, to the fault injection detector, an indication for selecting a sensitivity level according to at least one instruction I which, standalone, is associated with a highest fault detection sensitivity level from among said plural sensitivity levels.

17. The system according to claim 16 where said at least one instruction I, once decoded, takes priority over all other instructions being decoded and takes priority over all other instructions about to be executed in that said highest detection sensitivity level is set starting immediately upon decoding of said instruction I and ending only after said instruction I has been fully executed, irrespective of said other instructions being decoded and said other instructions about to be executed.

18. The system according to claim 1 wherein said processor core output indications comprise output indications of which op-code is about to be executed.

19. The system according to claim 1 wherein the fault injection detector is operative to protect a CPU, whose decode-execution cycle for a single instruction is T time units long, from fault injection attacks, and wherein the fault injection detector has a response time which is shorter than T.

20. The system according to claim 1 wherein said fault injection detector comprises plural fault injection detector units deployed in plural processor core locations respectively thereby to detect fault injection attacks at all of said plural processor core locations.

21. The system according to claim 20 wherein said fault injection detector alerts if at least one of the detector units, deployed at said location L, detects a fault injection attack at location L.

22. The system according to claim 1, wherein said circuitry is differentially sensitive, when protecting the processor core from hardware fault injection attacks, depending on said output indications of said at least some instructions.

23. The system according to claim 1, wherein said circuitry avoids at least one false alarm which results when processor core protection is provided at a sensitivity level unrelated to said output indications of said at least some instructions.

24. A security method which dynamically, depending on processor core execution flow, controls fault injection countermeasure circuitry operative to protect said processor core from hardware fault injection attacks, the method comprising:
providing a processor core which, when in use, executes instructions and concurrently, generates, in real time, output indications of at least some instructions which are about to be executed; and
hardware fault injection countermeasure circuitry operative to protect said processor core from hardware fault injection attacks which is differentially sensitive, when protecting the processor core from hardware fault injection attacks, including:
providing a hardware fault injection detector having plural sensitivity levels which are selectable in real time; and
in real time, using a sensitivity level control module, to:
receive said output indications,
select a next sensitivity level from among said plural selectable sensitivity levels using sensitivity level selection logic which receives at least said output indications as inputs, and
set the hardware fault injection detector to said next sensitivity level,
thereby to provide hardware fault injection countermeasure circuitry which is operative to protect said processor core from hardware fault injection attacks and wherein said circuitry is differentially sensitive, when protecting the processor core from hardware fault injection attacks, depending on said output indications of said at least some instructions, or avoids at least one false alarm which results when processor core protection is provided at a sensitivity level unrelated to said output indications of said at least some instructions,
wherein said fault injection detector comprises an analog circuit having plural tuning options respectively corresponding to said plural sensitivity levels.

25. The method according to claim 24 wherein the processor core includes adapted decode logic which at least once decodes an individual instruction fetched from program memory thereby to derive at least one CPU-internal signal which subsequently operates at least one unit of the CPU thereby to execute said individual instruction, and wherein the decode logic is further adapted to provide, before the at least one unit operates responsive to the at least one CPU-internal signal derived from said individual instruction fetched from program memory, an output indication of said individual instruction, thereby to allow the fault injection detector to be set to said next sensitivity level before said individual instruction is executed, rather than after.

26. The method according to claim 24 wherein the processor core decodes opcodes by applying combinational logic thereto, thereby to generate signals which comprise instructions to the processor core's execution units and said output indications comprise signals exported from the processor core which are indicative of said instructions decoded from said opcodes, thereby to provide to the sensitivity level selection logic a preview of an instruction yet to be executed by the processor core.

* * * * *